US010443825B2

(12) United States Patent
Kennedy

(10) Patent No.: US 10,443,825 B2
(45) Date of Patent: Oct. 15, 2019

(54) RIDGELINE ROOF CLIP FOR SECURING HOLIDAY LIGHTING

(71) Applicant: Stacy Lee Kennedy, Mansfield, TX (US)

(72) Inventor: Stacy Lee Kennedy, Mansfield, TX (US)

( * ) Notice: Subject to any disclaimer, the term of this patent is extended or adjusted under 35 U.S.C. 154(b) by 82 days.

(21) Appl. No.: 15/051,662

(22) Filed: Feb. 23, 2016

(65) Prior Publication Data

US 2016/0245489 A1 Aug. 25, 2016

Related U.S. Application Data

(60) Provisional application No. 62/119,464, filed on Feb. 23, 2015.

(51) Int. Cl.
| | |
|---|---|
| *F16B 2/22* | (2006.01) |
| *F21V 21/088* | (2006.01) |
| *F21W 121/00* | (2006.01) |
| *F16M 13/02* | (2006.01) |
| *F21S 4/00* | (2016.01) |

(52) U.S. Cl.
CPC .............. *F21V 21/088* (2013.01); *F16B 2/22* (2013.01); *F16M 13/022* (2013.01); *F21S 4/00* (2013.01); *F21W 2121/004* (2013.01)

(58) Field of Classification Search
CPC .. F21V 21/088; F21S 4/10; F21S 4/00; F21W 2121/004; F16B 2/22; F16M 13/022; F16L 3/13
USPC .. 248/237, 536, 148, 229.16, 229.26, 228.7, 248/230.7, 231.81, 74.2; 24/531
See application file for complete search history.

(56) References Cited

U.S. PATENT DOCUMENTS

| | | | | | |
|---|---|---|---|---|---|
| 2,869,812 | A | * | 1/1959 | Hamel | A01K 97/10 114/364 |
| 3,131,447 | A | * | 5/1964 | Tinnerman | F16L 3/24 248/228.7 |
| 3,589,660 | A | * | 6/1971 | Dunckel | F21V 21/02 248/343 |
| 3,780,973 | A | * | 12/1973 | Dalton, Jr. | E04B 9/006 248/228.8 |
| 3,797,791 | A | * | 3/1974 | Psencik | E04B 9/006 248/228.7 |
| 3,883,926 | A | * | 5/1975 | Reynolds | F16B 2/245 24/339 |
| 4,491,902 | A | * | 1/1985 | Cangelosi | F21V 19/0005 248/231.21 |

(Continued)

OTHER PUBLICATIONS

LawnSite; Christmas Lights on Ridgeline; Nov. 12, 2007; https://www.lawnsite.com/threads/christmas-lights-on-ridgeline.206353/.*

*Primary Examiner* — Ingrid M Weinhold
(74) *Attorney, Agent, or Firm* — Law Office of Jeff Williams PLLC; J. Oliver Williams

(57) ABSTRACT

A device and method for the attachment of lighting to the ridgeline of a roof. The device includes a body configured to include a plurality of legs that are designed to flex outward and inward. The legs include one or more projection members along an inner surface. The projection member are configured to translate along the surface of a roof member and grip around opposing edges in order to locate and secure the device. The device further includes a top portion in communication with the body to locate and secure any of lighting strands, bulb sockets, and other items in relation to the roof member.

5 Claims, 3 Drawing Sheets

(56) References Cited

U.S. PATENT DOCUMENTS

| | | | | |
|---|---|---|---|---|
| 4,888,671 A * | 12/1989 | Reimer | F21V 21/34 | 362/249.16 |
| 4,962,907 A * | 10/1990 | Gary | F21V 19/0005 | 248/205.3 |
| 5,056,747 A * | 10/1991 | Kireta | F21V 19/006 | 211/26 |
| 5,400,992 A * | 3/1995 | Pohl | G09F 7/18 | 248/214 |
| D365,014 S * | 12/1995 | Fennessy | D26/138 | |
| 5,580,159 A * | 12/1996 | Liu | F21V 19/0005 | 362/249.01 |
| 5,581,956 A * | 12/1996 | Fennessy | F21V 21/088 | 248/237 |
| 5,595,439 A * | 1/1997 | Maddock | F21V 19/0005 | 362/238 |
| 5,607,230 A * | 3/1997 | Protz, Jr. | F21V 21/08 | 248/229.16 |
| 5,653,412 A * | 8/1997 | Martorano | F21V 21/025 | 248/222.11 |
| D393,201 S * | 4/1998 | Hearidge | D8/395 | |
| 5,893,628 A * | 4/1999 | Byers | F21V 3/02 | 362/145 |
| D415,570 S * | 10/1999 | Bradshaw | D24/224 | |
| 5,975,889 A * | 11/1999 | Culpepper | F21V 21/08 | 248/205.3 |
| 6,109,765 A * | 8/2000 | Blanton | F21V 21/088 | 248/229.26 |
| 6,536,727 B1 * | 3/2003 | Limber | F16B 2/22 | 248/227.1 |
| D476,555 S * | 7/2003 | Niwa | D6/328 | |
| 6,663,069 B1 * | 12/2003 | Norberg | F21V 21/08 | 24/339 |
| 7,059,749 B1 * | 6/2006 | Bernier | F21V 21/088 | 24/336 |
| D531,018 S * | 10/2006 | Jackson | D8/395 | |
| 7,131,170 B2 * | 11/2006 | Weaver | A46B 17/02 | 24/545 |
| D537,330 S * | 2/2007 | Cox | D8/395 | |
| 7,219,863 B1 * | 5/2007 | Collett, II | F16L 3/04 | 174/154 |
| 7,608,782 B2 * | 10/2009 | Hill | H01R 4/48 | 174/84 C |
| 7,963,490 B2 * | 6/2011 | Pritchard | F21V 21/088 | 248/211 |
| D675,087 S * | 1/2013 | Gary | D8/395 | |
| D675,512 S * | 2/2013 | Gary | D8/395 | |
| D696,105 S * | 12/2013 | Devilliers | D8/395 | |
| 8,888,337 B2 * | 11/2014 | Adams, IV | F21V 21/088 | 362/287 |
| 8,960,616 B2 * | 2/2015 | Gibbons | F16M 13/022 | 248/200 |
| 9,127,805 B2 * | 9/2015 | Gibbons | F16M 13/022 | |
| 9,378,666 B1 * | 6/2016 | Woodruff | E04H 12/32 | |
| 9,657,894 B2 * | 5/2017 | Gibbons | F16B 2/22 | |
| 2007/0114340 A1 * | 5/2007 | Adams | F16L 3/13 | 248/72 |
| 2009/0133350 A1 * | 5/2009 | Pritchard | F21V 21/088 | 52/520 |
| 2010/0132275 A1 * | 6/2010 | Stanger | E04D 3/30 | 52/173.3 |
| 2011/0108150 A1 * | 5/2011 | Renaud | F16L 3/06 | 138/118 |
| 2011/0247294 A1 * | 10/2011 | Pritchard | F21V 21/088 | 52/745.21 |
| 2012/0298813 A1 * | 11/2012 | Gibbons | F16M 13/022 | 248/201 |
| 2012/0311942 A1 * | 12/2012 | Gere | E04D 5/06 | 52/94 |
| 2013/0086777 A1 * | 4/2013 | McLaughlin | F16B 2/22 | 24/546 |
| 2013/0148366 A1 * | 6/2013 | Adams, IV | F21V 21/088 | 362/396 |
| 2013/0333197 A1 * | 12/2013 | Schulte | B25J 1/04 | 29/525.08 |
| 2016/0025263 A1 * | 1/2016 | Gibbons | F16B 2/22 | 248/216.1 |
| 2016/0223171 A1 * | 8/2016 | Gibbons | H02J 7/355 | |

* cited by examiner

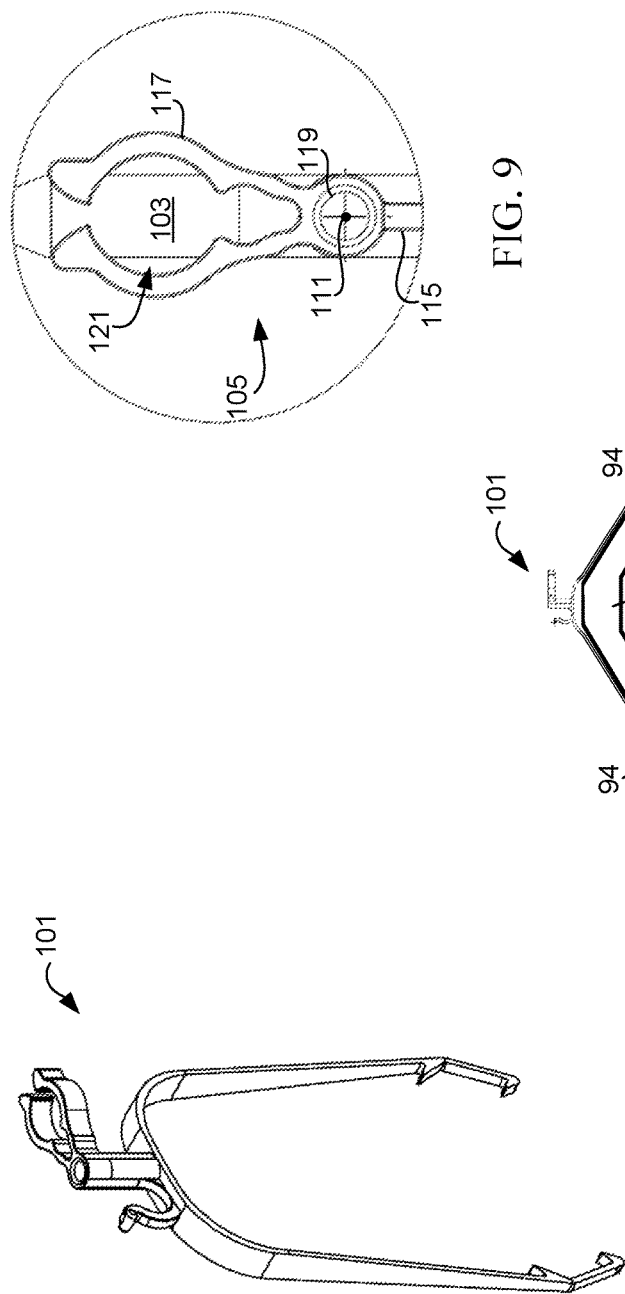
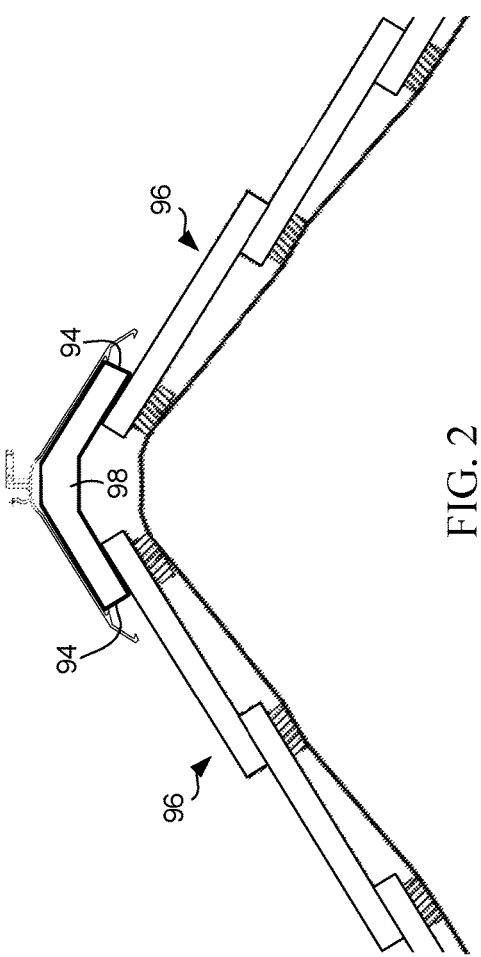
FIG. 9
FIG. 2
FIG. 1

RIDGELINE ROOF CLIP FOR SECURING HOLIDAY LIGHTING

CLAIM OF PRIORITY

This application claims the benefit of U.S. Provisional Application No. 62/119,464, filed 23 Feb. 2015. The information contained therein is hereby incorporated by reference.

BACKGROUND

1. Field of the Invention

The present application relates to a device for securing lights to a roof, and more particularly to a clip used in the arrangement of holiday lights at the peak of a roof.

2. Description of Related Art

It is generally accepted that individuals tend to string lights along the roof of their homes during the holiday season. Common areas are around the eves and along the front fascia boards. In this spot, fasteners are attached to the boards. There is no fear of leaking at these locations because it is not affecting the roofing materials. It is also common for individuals to attempt to locate holiday lights across their roofing materials, and in particular to the ridgeline of the roof. The issue that arises is how to do this in a way that does not lead to potential leaks, puncturing of the roofing material, modification of the roofing material, and yet still safely secures the light strand.

It is common place for individuals to secure these roof lights to try and slide lights underneath the roofing materials or penetrate the roofing materials in some way to provide a place to hold the lights. Doing so tends to break the seal of the roofing material from neighboring areas and can lead to the voiding of warranties related to the roof. This movement and manipulation of the roofing materials can also easily lead to damaged roofs and loose roofing materials. Although some advancements have been made in methods of attaching light strands to roofs, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 1 is a perspective view of a roof clip according to an embodiment of the present application.

FIG. 2 is a front view of the roof clip of FIG. 1 latched onto a ridgeline roof member.

FIG. 9 is an enlarged top view of the top portion of the roof clip of FIG. 7.

Figure 7:
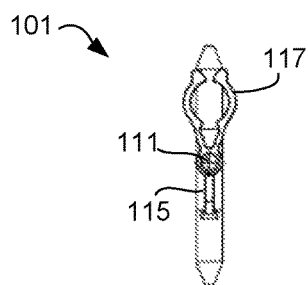
FIG. 7 is a top view of the roof clip of FIG. 3.

While the device and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The device and method in accordance with the present application overcomes one or more of the above-discussed problems commonly associated with traditional methods of securing lights to a roof. In particular, the device is configured to flex over the upper surface of a shingle or other roofing material and grip one or more edges. The device is configured to be secured without the need to manipulate or puncture the roofing material. The device is also configured to be at rest in an upright position so as to elevate the lights off the surface of the roofing material. The method of use is simple and designed to minimize installation and removal times. Among the many uses of the device herein described is the ability to hold holiday lighting over the roof without causing damage to or manipulating the roofing materials. These and other unique features of the device are discussed below and illustrated in the accompanying drawings.

The device and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The device and method of the present application is illustrated in the associated drawings. The device includes a body having a first leg and a second leg. The legs are opposite one another and configured to flex in an outward orientation. The flexure is greater at the tips of each leg. A top portion is coupled to the body and used to locate the legs and the body. Additional features and functions of the device are illustrated and discussed below.

Referring now to the drawings wherein like reference characters identify corresponding or similar elements in form and function throughout the several views. FIGS. 1-10 illustrate assorted views of roof clip device 101. FIG. 1 is a perspective view of device 101. In FIG. 2, device 101 is illustrated in an operable position in communication with a roof 96. Roof 96 is made from any type of roofing material. The materials may include composite materials, metals, tiles, and shingles to name a few. Cap 98 is a roofing material that is located at the peak of roof 96. The purpose of cap 98 is to cover the gap between opposing slopes of the roof 96. It is commonly desired to locate one or more lights or strands of lights along the ridge or peak of roof 96. Device 101 is configured to securely attach to cap 98 along one or more edges 94.

Device 101 includes a body 103 and a top portion 105. The top portion 105 extending out from an upper surface of the body 103. Body 103 includes a plurality of opposing legs, namely at least a first leg 107 and a second leg 109. First leg 107 is opposite that of second leg 109. Each leg extends outward in an elongated and trimmed contour such that each leg 107/109 is flexible at the tip. The tip is the portion of each leg furthest from top portion 105. Each leg is configured to flex outward away from central axis 111. The degree of flexure is greater along the length of each leg with its greatest degree of flexure being at the tip of each leg. When flexed, the legs separate in distance from the central axis 111 and translate along cap 98 until each leg grips on the edge 94 of the cap member 98.

FIGS. 3-10 further illustrate various views of device 101. Top portion 105 is coupled to the upper surface of body 103 and is configured to locate and operate body 103 in relation to cap member 98. Top portion 105 is coupled to any location on body 103 and is typically located at the thickest point of body 103. Therefore, legs 107/109 are defined in terms of length as their respective overall distance from that of top portion 105. In the Figures, top portion 105 defines and is located along a symmetric axis (central axis) 111 of body 103. Central axis 111 passes through body 103 and extends relatively coplanar with legs 107/109 such that legs 107/109 and central axis 111 are in the same plane. Therefore, legs 107/109 are equal in length.

It is understood that top portion 105 is not herein limited to alignment with central axis 111. Furthermore, the length of legs 107/109 may be varied, such that other embodiments may utilize legs of differently lengths and contours. Additionally, any number of legs may be used as long as the legs are flexible and oppose another member to provide a flexure force suitable to retain the position of body 103 and top portion 105.

Top portion 105 includes any or all of the following: an attachment member 113, a flange 115, a tab member 117, and a port 119. Each is used to secure one or more lights or lighting strands to roof 96 along cap member 98. Attachment member 113 is in communication with body 103. Member 113 is more rigid than body 103 and its associated legs 107/109. A user is able to grab hold of member 113 and apply pressure so as to induce flexure in the legs along an outer surface of cap member 98. Attachment member 113 also is configured to act as support for and assist in the operation of flange 115, tab member 117, and port 119.

Flange 115 is adjacent to and coupled to both body 103 and attachment member 113. Flange is configured to include a particular contour that allows it to flex in relation to member 113. The contour is such that the distance relative to the attachment member changes along the length of flange 115. At the distal end of flange 115, the degree of flexure away from and toward member 113 is greatest. The contour of flange 115 defines an internal area 120. This is best seen by referencing FIG. 8 in the drawings. Flange 115 is shaped such that it defines an opening into internal area 120. The opening is smaller than internal diameter of area 120 when at rest. The flexure of flange 115 allows area 120 to accept one or more strands of lights. The strands themselves are inserted into area 120 by passing them through the opening. The distance X (see FIG. 8) denotes the size of the opening of area 120. Distance X is small enough to restrict the undesired removal or release of the strand. Flange 115 may be opened such that distance X is increased to accept the strands. Flange 115 is configured to accept repeated flexure without the permanent loss of shape. It should be understood that flange 115 may be coupled directly to member 113 or may be coupled to body 103. As seen in the Figures, flange 115 may also be attached to both member 113 and body 103.

Tab member 117 is configured to extend out from attachment member 113 and define a void space 121. This is best seen by referencing FIG. 9 in the drawings. Tab member 117 is configured to accept and secure the base of a bulb socket used in holiday lights. Tab member 117 is designed to hold them up in an upright orientation and particularly away from and not in contact with any roofing materials. It is understood that tab member 117 may be designed to have any type of shape or contour. As seen in the figures, member 117 includes opposing arms designed to flex so as to adjust to different sized light bulb sockets. The flexure allows the void space to vary in surface area or volume as member 117 is manipulated. The internal contours of void space 121 may be shaped to according to any desired pattern. The void space is substantially perpendicular to internal area 119.

Port 119 is formed within attachment member 113. Port 119 is a depression or hollowed area within member 113. As seen in the Figures, port 119 may be concentric to axis 111, as seen in FIG. 9. Port 119 is designed to accept one or more different types of objects associated with holiday lighting, decorations, or other objects.

Figure 3:
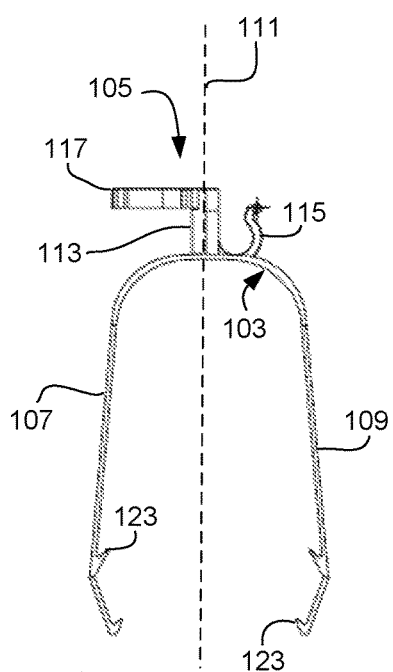
FIG. 3 is a front view of the roof clip of FIG. 1.
Figure 4:
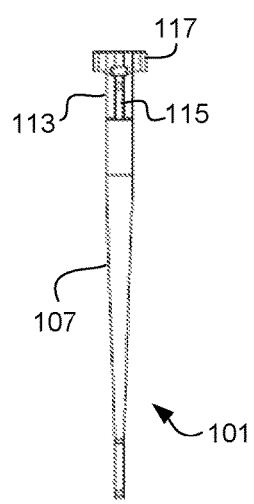
FIG. 4 is a side view of the roof clip of FIG. 3.
Figure 5:
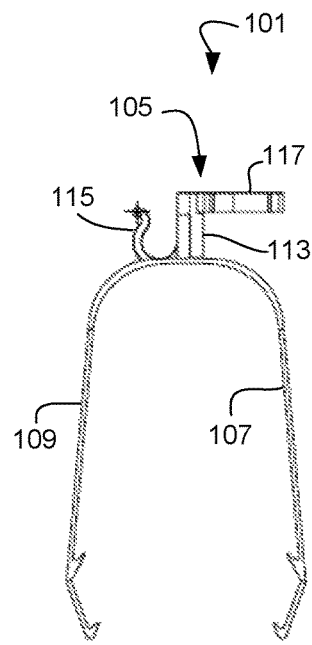
FIG. 5 is a rear view of the roof clip of FIG. 3.
Figure 6:
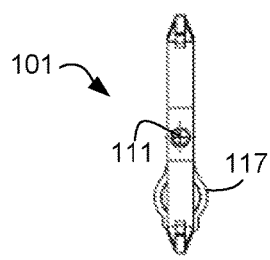
FIG. 6 is a bottom view of the roof clip of FIG. 3.
Figure 8:
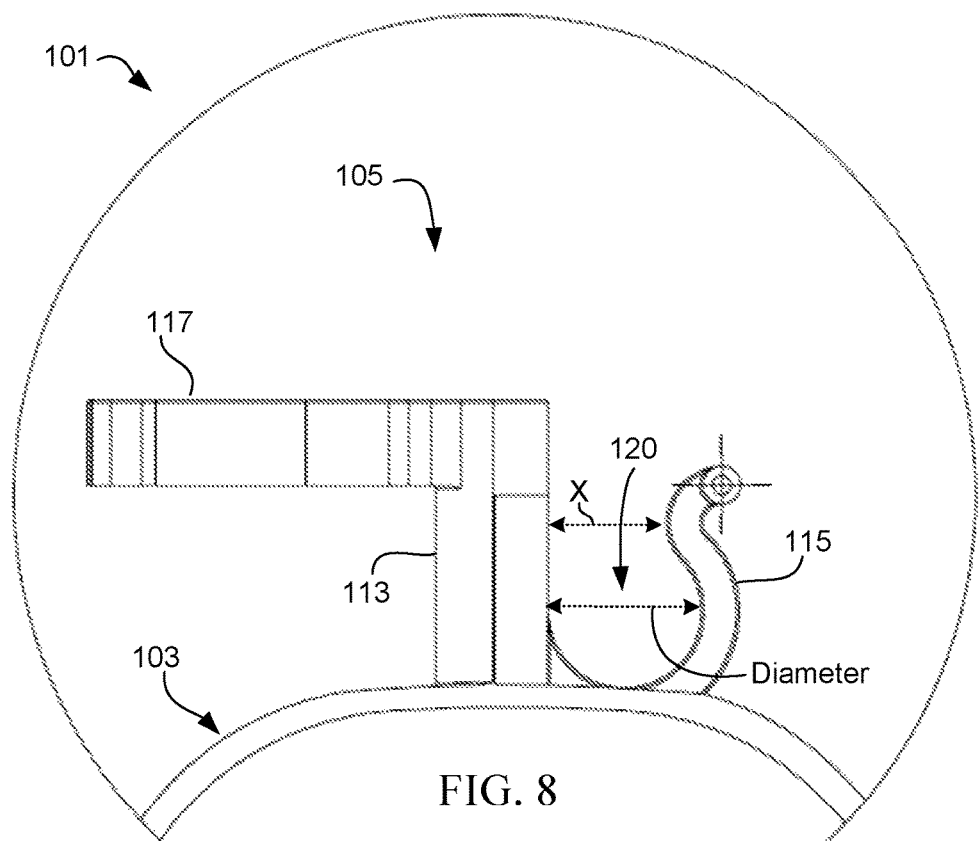
FIG. 8 is an enlarged front view of a top portion of the roof clip of FIG. 3.
Figure 10:
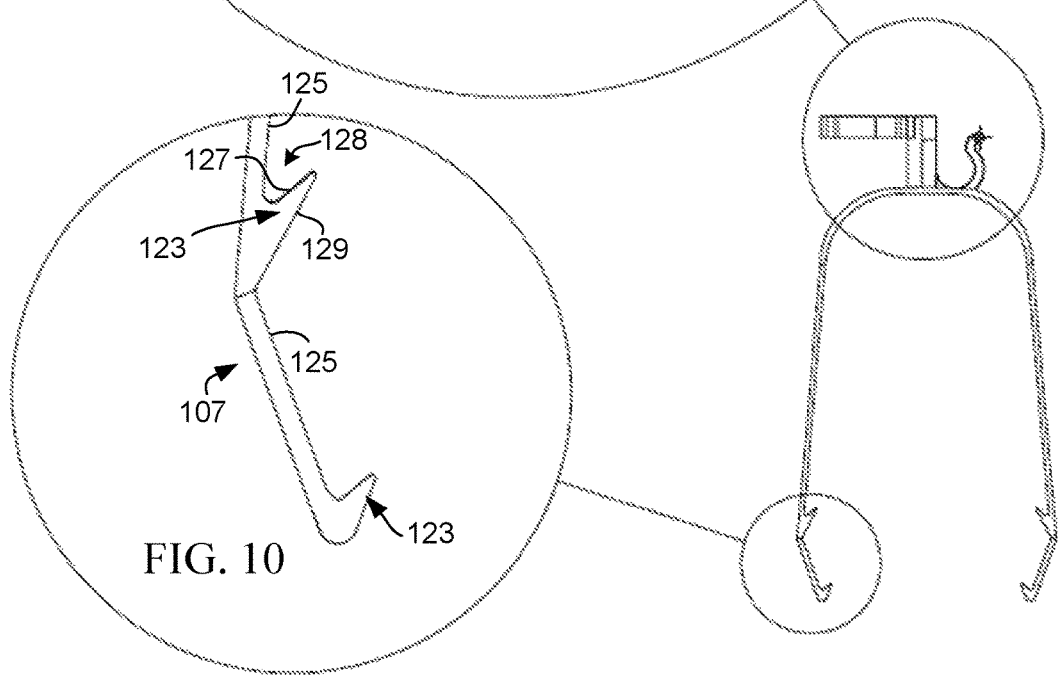
FIG. 10 is an enlarged front view of projection members of the roof clip of FIG. 3.

Referring now back to legs 107 and 109, FIG. 10 illustrates an enlarged side view of leg 107 as seen from FIG. 3. Legs 107/109 each have at least one projection member 123. Members 123 are a tabular extension protruding forth from an inner surface 125 of each leg. The members of each leg are designed to extend toward the opposing leg or toward axis 111. Projection members 123 are configured to pass along the surface of cap member 98 and grip around edge 94. Projection members 123 are oriented upward toward body 103 and top portion 105, such that they define an opening 128. Each projection member 123 includes an outer surface 129 and an inner surface 127, wherein the outer surface 129 is longer than inner surface 127. Projection members 123 are designed to accept edge 94 into opening 128. Inner surface 127 and leg 107 are designed to wrap around a portion of edge 94 (see FIG. 2). Although leg 109 is not shown specifically in FIG. 10, it is understood that leg 109 includes one or more projection members 123 as well. It is also understood that projection members 123 do not have to be located at the same relative location/distance on each respective leg.

To use and install device 101, a user presses down body 103 over the roofing material (cap member) so as to spread and flex legs 107/109 in opposing directions. The pressure is applied until the projection members engage edge 94 and locate top portion 105 in a desired position relative to the top surface of cap member 98. Once located along the ridgeline of the roof, light strands may be inserted into flange 115. Additionally, individual lights may be inserted into tab member 117. Other items may be located within port 119. To remove, a user merely flexes one or more legs further outward from axis 111 to release edge 94 from opening 128. It is understood that the timing of attaching one or more lights/strands of lights is not important. These may be attached and removed prior to or after installation or removal of device 101. Device 101 also acts best when used in plurality. For example, it is best to place a series of roof clips along the ridgeline of the roof in order to provide sufficient support along the length of the strand.

The current application has many advantages over the prior art including at least the following: (1) the ability to secure holiday lights to the ridgeline of a roof top without needing to manipulate or puncture the roofing material; (2) no need to break the seal of the roofing material; (3) ability to maintain the warranty on the roofing material; (4) adapted for holding strands and/or bulb sockets; (5) the design is able to fit various sized bulb sockets and one or more strands.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A roof clip device for attaching string lights to a peak of a roof, the roof clip device comprising:
   a body having an upper surface, the upper surface being curved;
   a first leg coupled to a first end of the body;
   a second leg coupled to a second end of the body, the first end of the body being opposite that of the second end of the body; and
   a top portion formed along the upper surface of the body, the top portion defining a central axis that passes through the body, each leg is configured to flex outward away from the central axis of the top portion for mounting to the roof, the top portion including:
      an attachment member extending upward from the upper surface of the body, the attachment member having a port forming a depression in the attachment member, the attachment member and the port being concentric with the central axis;
      a flange extending from a bottom portion of the attachment member and coupled to the upper surface of the body, the flange extends away from the first leg, the flange has a curvature that defines an internal area and an opening, a distance between the attachment member and the flange at the opening is less than a distance between the attachment member and the flange in the internal area, wherein the body, the first leg, the second leg, and the flange are coplanar in a first plane; and
      a tab member extending from a top portion of the attachment member in an opposing direction to that of the flange, wherein the flange and the tab member are separated from each other by the central axis, the tab member extends away from the second leg, the tab member consists of opposing arms each of which extends over the body, the opposing arms define a void space therebetween such that flexure of the opposing arms adjusts the void space, the flexure of the opposing arms occurring in a second plane which is substantially perpendicular to the first plane.

2. The device of claim 1, wherein the first leg has a first projection member extending inward toward the central axis, the first projection member angled upward toward the body.

3. The device of claim 1, wherein the second leg has a second projection member extending inward toward the central axis and is angled upward toward the body.

4. The device of claim 1, wherein the flange is configured to flex in relation to the attachment member away from the central axis.

5. The device of claim 4, wherein the flexure of the flange adjusts the distance between a distal end of the flange and the attachment member.

* * * * *